United States Patent Office 2,773,880
Patented Dec. 11, 1956

2,773,880

PROCESS FOR PRODUCING 4-SUBSTITUTED 1,2-DIARYL-3,5-DIOXO PYRAZOLIDINES

Josef Ctvrtnik, Olomouc, Oldrich Nemecek, Prague, and Jiri Mayer, Brno, Czechoslovakia, assignors to Synfarma, narodni podnik, Hostivar, Czechoslovakia, a company of Czechoslovakia No Drawing. Application September 23, 1955, Serial No. 536,276

Claims priority, application Czechoslovakia September 29, 1954

7 Claims. (Cl. 260—310)

This invention relates to a process for producing 4-substituted 1,2-diaryl-3,5-dioxo pyrazolidines, especially the 4-alkylated and 4-alkenylated derivatives of the referred to pyrazolidines.

The primary object of our invention is to provide a new process for the production of 4-substituted 1,2-diaryl-3,5-dioxo pyrazolidines. More specific objects of the present invention center about the preparation of the 4-alkylated, 4-alkenylated, 4,4-dialkylated, and 4,4-dialkenylated derivatives. Further objects of the invention will become apparent from the following description.

The alkyl derivatives of the aforesaid pyrazolidines have been prepared until now by condensing substituted malonic acid esters with 1,2-diaryl hydrazines, or by alkylating 1,2-diaryl-3,5-dioxo pyrazolidines having at least one free hydrogen atom in the position 4. The non-alkylated diaryl dioxo pyrazolidines, serving as starting materials, have been prepared by condensing non-substituted malonic acid esters with 1,2-diaryl hydrazines, e. g. hydrazobenzene. The 4-cycloalkylated diaryl dioxo pyrazolidines may be prepared by condensing a cyclic ketone with 1,2-diaryl-3,5-dioxo pyrazolidine having no substituent in the 4-position. First, a cycloalkylidene derivative forms, which is then hydrogenated in order to remove the double bond between the pyrazolidine nucleus and the cycloalkyl radical. The most important of these products is the 4-n-butyl derivative which shows excellent analgetic, antipyretic, and antirheumatic properties. This known method which is described e. g. in Ber., 1940, 73, 822, has the disadvantage that the final yield is rather low. Also, it is usually necessary to prepare pure alkylhalogenide, e. g. 1-bromo-n-butane which is a rather expensive starting material. Further, in many cases the alkylation does not run smoothly.

Our present invention consists in reacting halogenated unsaturated hydrocarbons having at least one halogen atom on a single bond carbon atom and at least one halogen atom on a double bond carbon atom, with a 1,2-diaryl-3,5-dioxo pyrazolidine or with its malonic component, and in treating the diaryl dioxo pyrazolidines thus formed, substituted in the position 4 by a single halogenalkenyl group or by two such groups, with reducing agents either immediately or after converting the halogenalkenyl pyrazolidines into their alkanonyl derivatives.

The process of our invention may be illustrated by the following schema in which R is alkyl and R' is aryl:

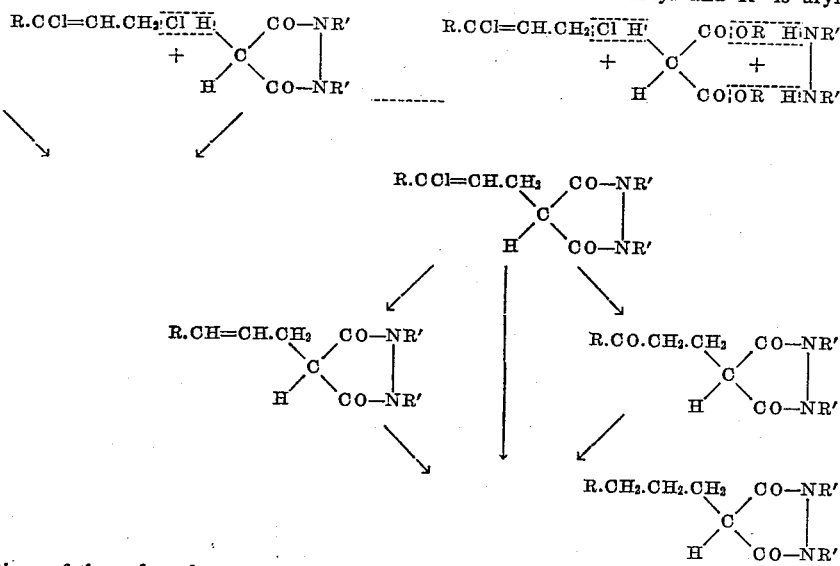

Some examples of the polyhalogenated alkenes which have been found to be suitable for the purpose of this invention are 1,3-dichlorobutene-2, 1,3-dichlorohexadiene-3,5, and trichlorohexenes. All these compounds may easily be prepared from waste products of the chloroprene manufacture. 1,3-dichlorobutene-2 is formed as a secondary product during the addition of hydrochloric acid to monovinylacetylene. 1,3-dichlorohexadiene-3,5 and trichlorohexenes may be obtained by hydrochloration of divinylacetylene which is a secondary product of the monovinylacetylene synthesis from acetylene. Said polyhalogenated alkenes and dienes are not only inexpensive but also more reactive than simple halogenalkanes, so that the halogenalkenylation can more readily be carried out than the usual alkylation. The reduction offers no difficulties and the yield of the process is relatively high. The most important of the polyhalogenated unsaturated hydrocarbons, suitable for the purpose of this invention, is 1,3-dichlorobutene-2; it is, as has been stated, easy to prepare from the waste material of the chloroprene manufacture and may be converted without appreciable difficulties into the valuable 4-butyl-1,2-diphenyl-3,5-dioxo pyrazolidine.

The selective reduction or hydrogenation of the halogenalkenyl pyrazolidines may be carried out either by splitting off the halogen atom only, whereby the double bond remains unchanged, or by converting the double bond into a single bond. In the first case, a 4-alkenyl diaryl dioxo pyrazolidine is built, whereas in the second case, a 4-alkyl derivative is obtained. The selective splitting off of the halogen atom only may be accomplished, for instance, by hydrogenation, using a palladium catalyst at room temperature under atmospheric pressure. Under conventional hydrogenation conditions, using e. g. Raney nickel and increased temperature and/or pressure, the corresponding alkyl derivative is obtained.

The reduction may be accomplished without introducing gaseous hydrogen. Instead, solid or liquid reducing agents may be used, e. g. sodium or its compounds, such as a sodium alcoholate, aluminum or its alloys in an alkaline aqueous medium, etc. When using sodium alcoholate, a 4-alkenyl derivative results. The use of aluminum in an alkaline aqueous medium leads to 4-alkyl derivatives. The reduction of 4-alkanonyl derivatives may be accomplished by the usual steps of removing an oxo group.

The present invention is illustrated by the following examples which, however, do not limit the scope of the invention:

Example 1

24.8 weight parts of 1,2-diphenyl-3,5-dioxo pyrazolidine are dissolved in an alkaline lye, containing an equivalent amount of NaOH. Into this solution, 12.5 parts of 1,3-dichlorobutene-2 are slowly dropwise introduced, while stirring. After the addition, the mixture is stirred for 15 more minutes at 20–50° C. The mixture is then cooled and shaken out with benzene or with another solvent, immiscible with water. The aqueous layer formed, containing the sodium salt of the gamma-chloroalkenylated pyrazolidine derivative, is separated, decolorized by means of activated charcoal, and acidified until a definite acid reaction on Congo red paper is achieved. The 1,2 - diphenyl - 3,5 - dioxo - 4 - gamma - chloro - crotyl pyrazolidine thus obtained forms, after purification by recrystallization from aqueous ethanol and acetone, respectively, colorless needles melting at 167–169° C. (corr.).

5 parts of said chlorocrotyl derivative are dissolved in an alkaline lye, prepared from 200 parts of water and 2 parts of sodium hydroxide. Thereafter, one part of Raney nickel is added. The mixture is hydrogenated at atmospheric pressure until the theoretical amount of hydrogen is consumed. Upon completion of the reaction, the catalyst is removed by filtration under suction, and from the obtained aqueous solution of its sodium salt, the 4-n-butyl-1,2-diphenyl-3,5-dioxo pyrazolidine is precipitated by acidification. The pure product melts at 105° C.

Example 2

24.8 parts of gamma-chlorocrotyl malonic acid diethyl ester, obtained by condensing malonic acid diethyl ester with 1,3-dichlorobutene-2, are poured into a solution of 2.53 parts of sodium and 18.4 parts of hydrazobenzene in 65 parts of absolute ethanol. The mixture is gradually heated to its boiling point, whereby the ethanol is simultaneously removed by distillation. The temperature rises gradually, and after 5 hours the condensation is finished. The mixture is diluted with 100 parts of water and treated according to Example 1.

5 parts of 4-gamma-chlorocrotyl-1,2-diphenyl-3,5-dioxo pyrazolidine are dissolved in 500 parts of ethanol. After adding 0.5 of palladium catalyst, precipitated on calcium carbonate, the mixture is hydrogenated under atmospheric pressure until the theoretical consumption of hydrogen is achieved, corresponding to the removal of the chlorine on the double bond. Ethanol is then distilled off. The residue is dissolved in a diluted alkaline lye and filtered. The filtrate is precipitated by adding hydrochloric acid, and the precipitate is sucked off. The 4-butenyl(2)-1,2-diphenyl-3,5-dioxo pyrazolidine, purified by recrystallization, melts at 128° C.

Example 3

A solution of 4.84 parts of sodium in 120 parts of water-free ethanol is added, drop by drop, to a mixture of 18.4 parts of hydrazobenzene, 16 parts of diethyl ester of malonic acid, and 12.5 parts of 1,3-dichlorobutene-2. The temperature is kept at 70° C. After the addition of the sodium ethylate, the mixture is kept boiling for 1 hour under reflux. Then, the ethanol is distilled off. The mashed residue is diluted with water and treated according to Example 1. 1 part of the compound obtained, which is identical with the 4-gamma-chlorocrotyl derivative obtained according to Example 1 or 2, is dissolved in 15 parts of dioxane and 50 parts of n-butanol on a water bath. Then, 2 parts of sodium are gradually thrown in during half an hour. After completion of the reaction, the mixture is cooled, 75 parts of water are added, and the water layer is extracted with benzene. The water layer is precipitated with concentrated hydrochloric acid, and the precipitate sucked off. After purification by recrystallization, 4-butenyl(2)-1,2-diphenyl-3,5-dioxo pyrazolidine, obtained in form of needlelike crystals, melts at 128° C.

Example 4

5 parts of the 4-gamma-chlorocrotyl-1,2-diphenyl-3,5-dioxo pyrazolidine, obtained according to Example 1, are dissolved in an alkaline lye, prepared by dissolving 25 parts of sodium hydroxide in 150 parts of water. 6 parts of powdered aluminum-nickel alloy (Raney alloy) are added in the course of 40 minutes at 70° C. After cooling, the separated nickel is removed by filtration and washed repeatedly with diluted sodium lye. The filtrate together with the washing liquid is precipitated with concentrated hydrochloric acid. The precipitate is sucked off, dissolved by boiling with excessive methanol, and freed from inorganic impurities by filtration. The hot filtrate is precipitated by adding water. Crystallized 4-n-butyl-1,2-diphenyl-3,5-dioxo pyrazolidine, melting at 105° C., is separated.

Example 5

4 - gamma - chlorocrotyl - 1,2 - diphenyl - 3,5 - dioxo pyrazolidine, prepared according to Example 1, is converted into the 4-butanonyl(2)-derivative by reacting the pyrazolidine with concentrated sulphuric acid until gaseous hydrogen chloride ceases to escape, and by decomposing the intermediate product with water.

7.5 parts of said 4-butanonyl(2)-1,2-diphenyl-3,5-dioxo pyrazolidine are mixed with 70 parts of diethylene glycol, 7 parts of potassium hydroxide, and 5 parts of hydrazine hydrate (almost 100%). The mixture is heated for 1 hour under reflux. Then the reflux cooler is replaced by a usual one, and the solvent is distilled off. During the distillation, the temperature rises gradually to 195–200° C. and is kept at this level for 4 more hours. After cooling, the mixture is poured into 500 parts of water and extracted three times with 250 parts of benzene. The aqueous portion is decolorized by means of activated charcoal and precipitated with hydrochloric acid. The 4 - n - butyl - 1,2 - diphenyl - 3,5-dioxo pyrazolidine, obtained in this way, melts after purification by recrystallization at 105° C.

Instead of a single substituted 1,2-diphenyl-3,5-dioxo pyrazolidine, double substituted derivatives may be prepared as well. For this purpose, the corresponding bishalogenalkenyl derivatives may be used, e. g. the bis-(gamma-chlorocrotyl)-malonic acid diethyl ester or the corresponding pyrazolidine, obtained therefrom by the above described method, bearing two halogenalkenyl radicals on the 4-carbon atom.

We claim:
1. Process for producing 4-substituted 1,2-diphenyl-3,5-dioxo pyrazolidines, comprising heating, in an alka- line medium, 1,3-dichlorobutene-2 with a compound selected from the group consisting of 1,2-diphenyl-3,5-dioxo pyrazolidine and its malonic component, and treating the obtained diphenyl dioxo pyrazolidine, substituted in the 4-position by at least a single gamma-chlorocrotyl group, with reducing agents.

2. Process for producing 4-n-butenyl-1,2-diphenyl-3,5-dioxo-pyrazolidine, comprising heating, in an alkaline medium, 1,3-dichlorobutene-2 with a compound selected from the group consisting of 1,2-diphenyl-3,5-dioxo pyrazolidine and its malonic component, and treating the obtained 4 - gamma - chlorocrotyl - 1,2 - diphenyl - 3,5-dioxo pyrazolidine with hydrogen at temperatures between about 0 and 50° C. in the presence of a palladium catalyst under atmospheric pressure.

3. Process for producing 4 - n - butenyl - 1,2 - diphenyl - 3,5 - dioxo pyrazolidine, comprising heating, in an alkaline medium, 1,3-dichlorobutene-2 with a compound selected from the group consisting of 1,2-diphenyl-3,5-dioxo pyrazolidine and its malonic component, and treating the obtained 4 - gamma - chlorocrotyl - 1,2 - diphenyl-3,5-dioxo pyrazolidine with sodium in an alcoholic solution.

4. Process of producing 4 - n - butyl - 1,2 - diphenyl-3,5-dioxo pyrazolidine, comprising heating, in an alkaline medium, 1,3-dichlorobutene-2 with a compound selected from the group consisting of 1,2-diphenyl-3,5-dioxo pyrazolidine and its malonic component, and treating the obtained 4 - gamma - chlorocrotyl - 1,2 - diphenyl-3,5-dioxo pyrazolidine in an alkaline aqueous medium with a reducing agent selected from the group consisting of aluminum and an aluminum-nickel alloy.

5. Process of producing 4 - n - butyl - 1,2 - diphenyl-3,5-dioxo pyrazolidine, comprising heating, in an alkaline medium, 1,3-dichlorobutene-2 with a compound selected from the group consisting of 1,2-diphenyl-3,5-dioxo pyrazolidine and its malonic component, treating the obtained 4 - gamma - chlorocrotyl - 1,2 - diphenyl - 3,5-dioxo pyrazolidine with hydrogen in the presence of Raney nickel in an aqueous alkaline solution, and precipitating the desired product by acidification.

6. Process of producing 4 - n - butyl - 1,2 - diphenyl-3,5-dioxo pyrazolidine, comprising heating, in an alkaline medium, 1,3-dichlorobutene-2 with a compound selected from the group consisting of 1,2-diphenyl-3,5-dioxo pyrazolidine and its malonic component, treating the obtained 4 - gamma - chlorocrotyl - 1,2 - diphenyl-3,5-dioxo pyrazolidine with concentrated sulphuric acid until gaseous hydrogen chloride ceases to escape, decomposing the intermediate product with water, and treating the thus obtained 4-butanonyl(2)-1,2-diphenyl-3,5-dioxo pyrazolidine with reducing agents.

7. Process for producing 4-n-butyl-1,2-diphenyl-3,5-dioxo pyrazolidine comprising heating a compound selected from the group consisting of malonic acid and its reactive derivatives with hydrazobenzene and 1,3-dichlorobutene-2 under gradual addition of a sodium alcoholate, isolating the 4-gamma-chlorocrotyl-1,2-diphenyl-3,5-dioxo pyrazolidine thus formed, and treating the latter with hydrogen in the presence of a catalyst.

References Cited in the file of this patent
UNITED STATES PATENTS

| | | |
|---|---|---|
| 2,562,830 | Stenzl | July 31, 1951 |
| 2,700,670 | Hafliger | Jan. 25, 1955 |